(12) United States Patent
Martin et al.

(10) Patent No.: US 6,381,692 B1
(45) Date of Patent: Apr. 30, 2002

(54) PIPELINED ASYNCHRONOUS PROCESSING

(75) Inventors: Alain J. Martin; Andrew Lines; Rajit Manohar; Uri Cummings; Mika Nystrom, all of Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/118,140

(22) Filed: Jul. 16, 1998

Related U.S. Application Data
(60) Provisional application No. 60/052,714, filed on Jul. 16, 1997, and provisional application No. 60/058,995, filed on Sep. 15, 1997.

(51) Int. Cl.[7] ............................................. G06F 9/00
(52) U.S. Cl. .......................................... 712/244; 712/25
(58) Field of Search ............................ 712/18, 23, 25, 712/41, 210, 216, 219, 244

(56) References Cited

U.S. PATENT DOCUMENTS

| | | | |
|---|---|---|---|
| 3,290,511 A | | 12/1966 | Sims, Jr. |
| 3,697,734 A | | 10/1972 | Booth |
| 4,680,701 A | | 7/1987 | Cochran |
| 5,347,639 A | | 9/1994 | Rechtschaffen |
| 5,553,276 A | | 9/1996 | Dean |
| 5,625,787 A | * | 4/1997 | Mahin et al. ............... 712/204 |
| 5,752,070 A | | 5/1998 | Martin |
| 5,887,129 A | * | 3/1999 | Day et al. ..................... 714/34 |

OTHER PUBLICATIONS

Richardson, "Precise exception handling for a self–timed processor" Oct. 1995, pp. 32–37.*

Furber, "AMULET2e: an asynchronous embedded controller", Apr. 1997, pp. 290–299.*

Furber, "AMULET1: a micropiplined ARM", Feb. 1994, pp. 476–485.*

Fellman, Ronald D.: "Design Issues and an Architecture for the Monolithic Implementation of a Parallel Digital Signal Processor," IEEE Transactions on Signal Processing; May 1990.

Jacobs et al: "A Fully Asynchronous Digital Signal Processor Using Self–Timed Circuits," IEEE Journal of Solid–State Circuits, Dec. 1990.

Shen et al: "The Virtual–Time Data–Parallel Machine," Frontiers of Massively Parallel Computation 1992.

Liebchen et al.: "Dynamic Reordering of High Latency Transactions Using a Modified Micropipeline," Computer Design—ICEE '92; 1992 International Conference.

Paver et al: "Register Locking in an Asynchronous Microprocessor," Computer Design—ICCE '92; 1992 International Conference.

Cho et al: "Design of a 32–Bit Fully Asynchronous Microprocessor (FAM)," Circuits and Systems; 1992; IEEE Midwest Symposium.

Arvind et al: "On the Performance Evaluation of Asynchronous Processor Architectures," Mascots '95; Modeling, Analysis, and Simulation International Workshop, 1995.

Chang et al: "Design of a Static Mimd Data Flow Processor Using Micropipelines," IEEE Transactions on Very Large Scale Integration (VLSI) Systems; Sep. 1995.

Werner et al: "Counterflow Pipeline Based Dynamic Instruction Scheduling," Advanced Research in Asynchronous Circuits and Systems; 1996 2nd International Symposium, 1996.

Arvind et al: "Static Scheduling of Instructions on Micronet–Based Asynchronous Processors," Advanced Research in Asynchronous Circuits and Systems; 1996 2nd International Symposium.

* cited by examiner

Primary Examiner—John F. Niebling
Assistant Examiner—Stacy A Whitmore
(74) Attorney, Agent, or Firm—Fish & Richardson P.C.

(57) ABSTRACT

An asynchronous processor having pipelined instruction fetching and execution to implement concurrent execution of instructions by two or more execution units. A writeback unit is connected to execution units and memory units to control information updates and to handle precise exception. A pipelined completion mechanism can be implemented to improve the throughput.

12 Claims, 4 Drawing Sheets

PIPELINED ASYNCHRONOUS PROCESSING

This application claims the benefit of U.S. provisional application Nos. 60/052,714, filed on Jul. 16, 1997, and 60/058,995, filed on Sep. 15, 1997, which are incorporated herein by reference.

FIELD OF THE INVENTION

The present invention relates to information processing, and more specifically to architecture and operation of asynchronous circuits and processors.

BACKGROUND

Many information processing devices operate based on a control clock signal to synchronize operations of different processing components. Different processing components usually operate at different speeds due to various factors including the nature of different functions and different characteristics of the components or properties of the signals processed by the components. Synchronization of these different processing components generally requires the clock speed of the control clock signal to accommodate the slowest processing speed of the processing components in these "synchronous" processing devices. Thus, some processing components may complete respective operations earlier than other slow components and have to wait until all processing components complete their operations. This is not an efficient way of utilizing available resources in some computer systems.

Most commercial digital processors are such synchronous processing devices, including various microprocessors used in personal computers and other devices. Speed of a synchronous processor is usually increased by increasing the clock speed. This forces the instructions to be executed faster, since an instruction is executed based on each clock cycle. The maximum clock speed can be limited by various factors such as the processing speed of a slow processing component, the way that a clock signal is generated, or various effects caused by miniaturization of the integrated circuits within a processor.

An alternative approach, pioneered by Alain Martin of California Institute of Technology, eliminates synchronization of different processing components according to a clock signal. Different processing components simply operate as fast as permitted by their structures and operating environments. There is no relationship between a clock speed and the operation speed. This obviates many technical obstacles in a synchronous processor and can be used to construct an "asynchronous" processor with a much simplified architecture and a fast processing speed that are difficult to achieve with synchronous processors.

U.S. Pat. No. 5,752,070 to Martin and Burns discloses such an asynchronous processor, which is incorporated herein by reference in its entirety. This asynchronous processor operates without a clock and goes against the conventional wisdom of using a clock to synchronize the various parts and operations of the processor. The instructions can be executed as fast as the processing circuits allow and the processing speed is essentially limited by only gate and interconnection delays.

Such an asynchronous processor can be optimized for fast processing by special pipelining techniques based on unique properties of the asynchronous architecture. Asynchronous pipelining allows multiple instructions to be executed at the same time. This has the effect of executing instructions in a different order than originally intended. An asynchronous processor compensates for this out-of-order execution by maintaining the integrity of the output data.

SUMMARY

The present disclosure describes improved devices and processing methods for asynchronous processing. The disclosed architecture, circuit configurations and processing methods can be advantageously used to construct high-speed asynchronous digital processors.

One embodiment of the asynchronous system for information processing which is independent of a clock signal, comprises:

a plurality of execution units including a program counter unit, a memory unit, and at least one arithmetic logic unit, said execution units connected relative to one another in parallel;

a register unit having registers, connected to said execution units;

a fetch unit, connected to said program counter unit to receive a program counter signal and configured to retrieve instructions from an instruction memory unit according to said program counter signal;

a decoder connected to receive said instructions from said fetch unit and configured to decode said instructions to generate decoded instructions, wherein said decoder is connected to communicate with each of said execution units and said register unit;

a writeback unit communicating with said execution units and register unit to filter and route information from one member of said execution units and register unit to another member;

a first queue disposed between said decoder and said writeback unit to store and transfer ordering information to said writeback unit to indicate an order in which said decoder dispatches said decoded instructions to said execution units; and a second queue disposed between said program counter unit and said writeback unit to store and transfer said program counter signal to said writeback unit, wherein said program counter unit, said fetch unit, said instruction memory unit, and said decoder form a pipelined fetching loop operable to simultaneously transfer at least two instructions unsyncrhonized with respect to each other.

One aspect of the invention for exception handling is the write-back unit with which each execution unit that can cause an exception communicates.

Another aspect of the invention is pipelining of the completion mechanism to improve the throughput of the system.

These and other aspects and advantages will become more apparent in light the following accompanying drawings, the detailed description, and the appended claims.

DETAILED DESCRIPTION OF THE PREFERRED EMBODIMENTS

Figure 1:
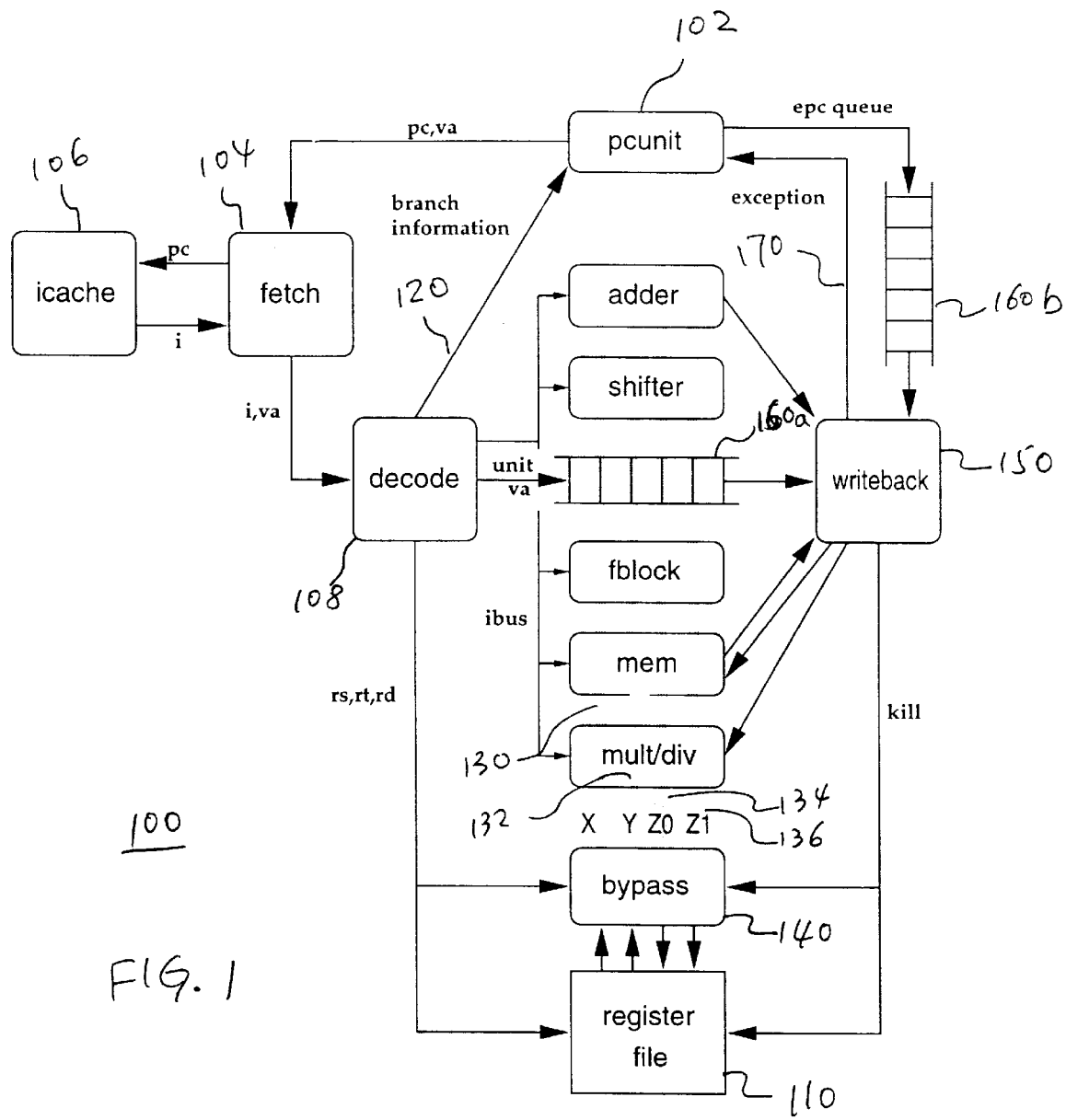
FIG. 1 is a block diagram showing one embodiment of an asynchronous processor.

The preferred embodiments of the device architecture, processing circuits, and processing techniques will be described herein with a specific reference to the MIPS R3000 RISC microprocessor standard. The MIPS R3000 is the archetype of a commercial RISC microprocessor and has many typical features of a general RISC processor without being overly complicated. The MIPS R3000 is used to illustrate certain aspects and advantages of the present invention and it should be understood that the particular limitations and characteristics of the MIPS R3000 should not be construed as limitations of the present invention.

The performance of a processor may be characterized by an average instruction execution time, i.e., "cycle time," $\tau$, and average energy per instruction, E. Ideally, both $\tau$ and E should be as small as possible for a processor. Since these two parameters can be traded against each other through voltage adjustments, a figure of merit, $E\tau^2$, can be used as an indicator of the performance of a processor which is independent of the voltage in the first approximation. Minimizing this figure of merit is one of the criteria in choosing architectural and circuit decisions. This figure of merit can be used to compare different designs. Furthermore, once a desired $E\tau^2$ is determined, the robustness of asynchronous designs to voltage variations can be exploited to achieve both high speed at high voltage and low power at low voltage. For instance, asynchronous MIPS according to one embodiment can be configured to deliver 100 MIPS for less than 0.5 W of power at 1.5 V, which is better performance than that of low-power designs like the StrongARM in equivalent technologies.

The asynchronous circuits disclosed herein are quasi delay-insensitive ("QDI") in the sense that such circuits do not use any assumption on, or knowledge of, delays in most operators and wires. The exception is for some forks, called isochronic forks, in which the delays on the different branches of the fork are assumed to be similar. See, Martin, "The Limitations to Delay-Insensitivity in Asynchronous Circuits," Sixth MIT Conference on Advanced Research in VLSI, ed. W. J. Dally, MIT Press, 1990. QDI circuits may be the most conservative asynchronous circuits in terms of the use of delays. But QDI circuits are also robust to variations in physical parameters because their dependence on delays is minimal. This robustness allows for exchanging energy and throughput against each other through voltage adjustments. It can also be shown that delay assumptions are not necessary to achieve high performance in asynchronous circuits.

Architecture of Asynchronous Pipeline

The MIPS R3000 includes two tightly-coupled processors, usually implemented on a single chip: a full 32-bit RISC CPU, and a memory-management unit, called CP0. A R3000 processor can be extended with three off-chip coprocessors. Coprocessor 1 (CP1) is specified by the instruction set to be the floating-point unit. The other two are unspecified.

The CPU has 32 32-bit general-purpose registers, a program counter, and two special-purpose registers for multi-plication and division. Two operating modes, user and kernel modes, are used to provide different levels of hardware protection. Branches have a single delay-slot. Although the MIPS ISA (Instruction Set Architecture) allows both little-endian and big-endian modes to be selected on reset, the examples here are assumed to implement little-endian mode only.

R3000 has three types of instructions: Immediate, jump, or register, with the following structures:

immediate: <op, rs, rt, immediate> jump: <op, target> register: <op, rs, rt, rd, sa, func> wherein the field op is the operation code ("opcode"); the fields rs, rt, and rd are register indices, immediate is an immediate offset, and target is an offset used in jump target calculation; sa is a shift amount, and func is a function-field supplementing the opcode when necessary.

The memory management system provides hardware for address translation in the form of an on-chip-64-entry Translation Lookaside Buffer ("TLB"). The R3000 has write-through direct-mapped caches with one-word cache lines.

FIG. 1 is a block diagram illustrating one embodiment 100 of an asynchronous pipeline architecture implementing the MIPS R3000. Lines with arrows represent communication channels and the arrows indicate the transmission directions of signals or data. Certain components of the MIPS R3000 are neglected for simplicity. For example, the TLB implementation, the partial-word memory operations are not included. The processor 100 is in general finely pipelined in order to achieve high throughput. But only a single box is shown in FIG. 1 for simplicity to represent two or more pipeline stages. This pipeline is described at a macroscopic level so that a box is meant to be one of the main units of the architecture.

A program counter unit 102 ("pc unit") is an execution unit that controls the sequence of instructions to be executed. A fetch unit 104 is connected to the pc unit 102 to receive a program counter so that a desired instruction ("i") is located and retrieved from an instruction cache 106 where instructions are stored. A decoder 108 connected to the fetch unit 104 analyzes the contents of an instruction to determine what operation is to be performed and what datums are needed (indicated by the register indices rs, rt, and rd) from a register unit 110 with general-purpose registers. Multiple execution units are connected to the decoder 108 via instruction bus ("ibus") and are each configured to carry out certain instructions. Examples of the execution units include the pcunit 102, a unit for adding, subtraction, and comparing ("adder"), a shifting unit ("shifter"), a function block for logical operation ("fblock"), a memory unit for executing load and store ("mem"), a multiplier/divider unit ("mult/div"), and other arithmetic logic units.

Four communication buses, two operand buses 130 (X), 132 (Y) and two result buses 134 (Z0), 136 (Z1), are used to provide communication between the register unit 110 and the execution units and pc unit 102. The result buses 134 and 136 preferably operate in an interleaved configuration so that the two result buses alternate with each other to transmit data to the register unit 110. Hence, if a result from one execution unit is sent to the register unit 110 by the result bus 134, the next result will be transmitted by the result bus 136. This reduces the overhead in controlling the two result buses. A special bypass unit 140 is implemented to bypass the register unit 110 in order to increase the processing speed.

The asynchronous processor 100 also includes a write-back unit ("WB") 150 that determines whether a result from an execution unit should be written into the registers such as the register unit 110, Hi/Lo in the multiplier/divider unit, the system memory and caches, or CP0 registers. This depends on whether an exception has occurred in a previously executed valid instruction. The precise exception is handled by using two queue units 160a, 160b in conjunction with the WB 150. The function and operation of the writeback unit 150 in handling precise exception will be described later in detail.

One aspect of the asynchronous processor 100 is a pipelined instruction fetching loop formed by the pc unit 102, the fetch unit 104, the icache 106 and the decoder 108. This fetching loop computes a subsequent program counter and fetches a desired instruction. Next, the instruction is decoded and executed. An execution cycle includes multiple pipelined steps: computing pc, fetching, decoding and executing. Since the MIPS has a one-delay slot, this pipeline can allow the execution of an instruction to overlap with the program counter calculation and the fetching of the next instruction: there are two instructions in different stages of processing in this loop.

The MIPS Instruction Set Architecture (ISA) specifies the order in which instructions are to be executed. Instructions are stored in memory that is addressed by a program counter. Assume that the instructions executed by the processor after it is turned on are labeled 1, 2, 3, . . . , N, etc. Instruction number K specifies the program counter for instruction number K+2. The program counter for instructions 1 and 2 are fixed constants.

The asynchronous processor 100 implements this ISA specification by using the fetching loop as follows. The pc unit 102 begins by sending out the program counter values for instructions 1 and 2. When the fetch unit 104 receives a program counter value, it sends the value to the icache 106 which returns the instruction stored at that program counter address. This instruction is then passed on to the decoder 108 by the fetch unit 104. The decoder 108 examines the instruction and sends information about program counter calculation to the pc unit 102 through a link 120. The pc unit 102 uses this information to compute the next program counter, which is then sent to the fetch unit 104. When there is no branch indicated by the signal in the link 120, the pc unit 102 produces program counter values to instruct the fetch unit 104 to fetch the instruction one by one in sequence. When a branch in indicated by the decoder 104, the normal sequential execution routine will be terminated and the pc unit 102 will send out a program counter value corresponding to an instruction required by that branch.

The mechanism described above has the effect of using the information from instruction K to compute the program counter for instruction number K+2, thus implementing the MIPS ISA. Since the fetch loop processes two instructions in parallel, this implementation of the ISA permits the processor 100 to execute instructions at a faster rate than if there were just one instruction in this loop. A modification for this fetching loop is to add buffers in the loop so more than two instructions can be pipelined.

Another pipelining mechanism in the asynchronous processor 100 is an asynchronous execution pipeline. This is very different from a synchronous pipeline. In a typical synchronous pipeline, the execution units and the WB are aligned in some specific sequence, and all the tokens go through all the units according to that specific sequence in order. In the asynchronous processor 100, all execution units are in parallel in the pipeline, and can execute concurrently and/or out of order with respect to one another regardless of which execution is started first. For example, a result coming out of the adder will not go through any other EU or the WB 150, but directly to the register unit 110. Since no clock signal is used to control the processing of the execution units, each execution unit computes as fast as possible and, when properly configured, can operate at its maximum possible speed.

As an illustration of the pipeline, the execution of a typical instruction, for example an addition: ADD rd, rs, rt, is described here. The net effect is defined as: "if GPR[rs]+GPR[rt]<$2^{32}$ then GPR[rd]:=GPR[rs]+GPR[rt] else overflow exception."

The program counter of the instruction is calculated by the PC unit 102 and sent to the FETCH unit 104, together with a "valid again" boolean label used in the exception handling phase of the pipeline. The FETCH unit 104 fetches the instruction from the instruction cache 106 and sends it to a predecode part of the decoder 108 while the tags in the instruction cache 106 are compared for hit or miss. If the tag indicates a hit, the decoding of the instruction is pursued normally. If it is a miss, the partially decoded instruction is killed, and the FETCH unit 104 fetches the same instruction from memory. (In the complete MIPS, address translation may cause an exception. This does not occur in the simplified MIPS processor.)

The decoder 108 finishes the decoding of the instruction: the opcode is passed to the ADD execution unit, and the rs, rt, rd fields are passed to the register unit 110 to select and reserve the operand registers rs, rt, and the result register rd. For handling the precise exception, the decoder 108 also adds to the "unit-number" queue 160a an entry to indicate that an add instruction has been dispatched.

From now on, the execution of the instruction involves several units operating concurrently: the adder decodes the opcode. The REG unit 110 sends the operands over the operand buses 130, 132 either from the registers GPR[rs] and GPR[rt] or from the bypass 140 if it happens that the previous instruction has produced a result to be written in GPR[rs] or GPR[rt]. Once the adder has received the operands from the operand buses 130,132, it performs the addition, which may either lead to an overflow exception or produce a valid result.

In both cases, the adder communicates with the writeback unit 150 which polls each execution unit in order of program execution. The program order is provided by the unit-number queue 160a. If the addition terminated normally, and if the addition is not part of a sequence of instructions that have to be canceled after an exception occurred, the WB 150 allows the result of the addition to be written back in the registers in the register unit 110, through one of the two result buses 134, 136. The decoder 108 decides which result bus is used, and this information is passed to the result bus interface of the adder.

The writing of the result in a register is delayed. The result is kept in the bypass unit 140 until the next cycle. If the addition has to be canceled either because it caused an overflow exception, or because it is in the sequence of "canceled instructions" following an exception, then the WB 150 sends a cancel command to the register unit 110.

When an exception occurs, the WB 150 sends an exception message to the PC unit 102 via an exception channel 170 and gathers the necessary information about the exception. The PC unit 102 probes the exception channel 170 once per iteration to see if an exception has occurred. If there is a pending exception message from the WB 150, the pc unit 102 updates the pc accordingly. Observe that probing the exception channel 170 when there is no exception is practically free since it does not involve any synchronization of the writeback unit 150 with the PC unit 102.

Branch/jump instructions are different from a regular instruction in that they do not go to an execution unit but directly from the DECODE 108 to the PC unit 102 through the link 120.

Since no clock signal is needed to synchronize executions, the execution units can perform concurrent and out-of-order execution of instructions. For example, while one execution unit is still executing the mth decoded instruction received from the decoder 108 in the pipelined fetching loop, another execution unit can start execution of the next (m+1)th instruction. Hence, two or more execution results may need be transmitted to the register unit 110 at the same time or during an overlapped period if a result is transmitted after it is generated without delay. This situation does not exist in single pipeline synchronous processors since the operation is clocked and only one result is produced or transmitted at a time. Therefore, two or more result buses are needed to transmit results to the register unit 110 in order to reduce delay, thus increasing the processing speed. In a preferred embodiment, the asynchronous processor 100 uses two result buses 134 and 136 in an alternate fashion to send results to the register unit 110.

Alternatively, the two result buses 134 and 136 may be controlled in other fashion. For example, a result can be transmitted to the register unit 110 via either the bus 134 or 136 depending which one is available at the time such transmission is desired. If all result buses are busy, the result will be transmitted using the first available result bus. However the bus control logic is implemented, more than two result buses may be used.

Two operand buses 130 and 132 are implemented in the processor 100 since an instruction, e.g., adding, may need to access two operands.

The asynchronous operation of the processor 100 also allows for further improving the processing speed by a unique bypassing mechanism. This is implemented by using the bypass unit 140. The bypass unit 140 is essentially a routing unit that can connect any result bus to any operand bus when such pathways are desired. Hence, a token becomes available for any execution unit or the pc unit 102 before that token is received and stored in the register unit 110. This reduces the time for an operand to become available for other operations.

For example, a result produced by the divider/multiplier unit is transmitted to the register unit 110. Assume this result is needed to perform an addition by the adder and the adder has already received the desired adding instruction from the decoder 108 and is waiting for this result from the divider/multiplier unit. Rather than continue to wait for the result being transmitted and stored to the register unit 110 and then being retrieved, the adder can perform the addition as soon as the result is produced by the divider/multiplier unit by activating the bypassing of the register unit 110. Assume the result is sent to the register unit 110 by using the result bus 136. The bypass unit 140 connects an operand bus (e.g., 132) to the result bus 136 so that while the result is still being transmitted to the register unit 110 it is also being simultaneously sent to the adder for the desired adding operation.

The bypass unit 140 may also be used to connect one operand bus to another so that a token retrieved from the register unit 110 is simultaneously available on these connected buses for processing by desired execution units.

Figure 2:
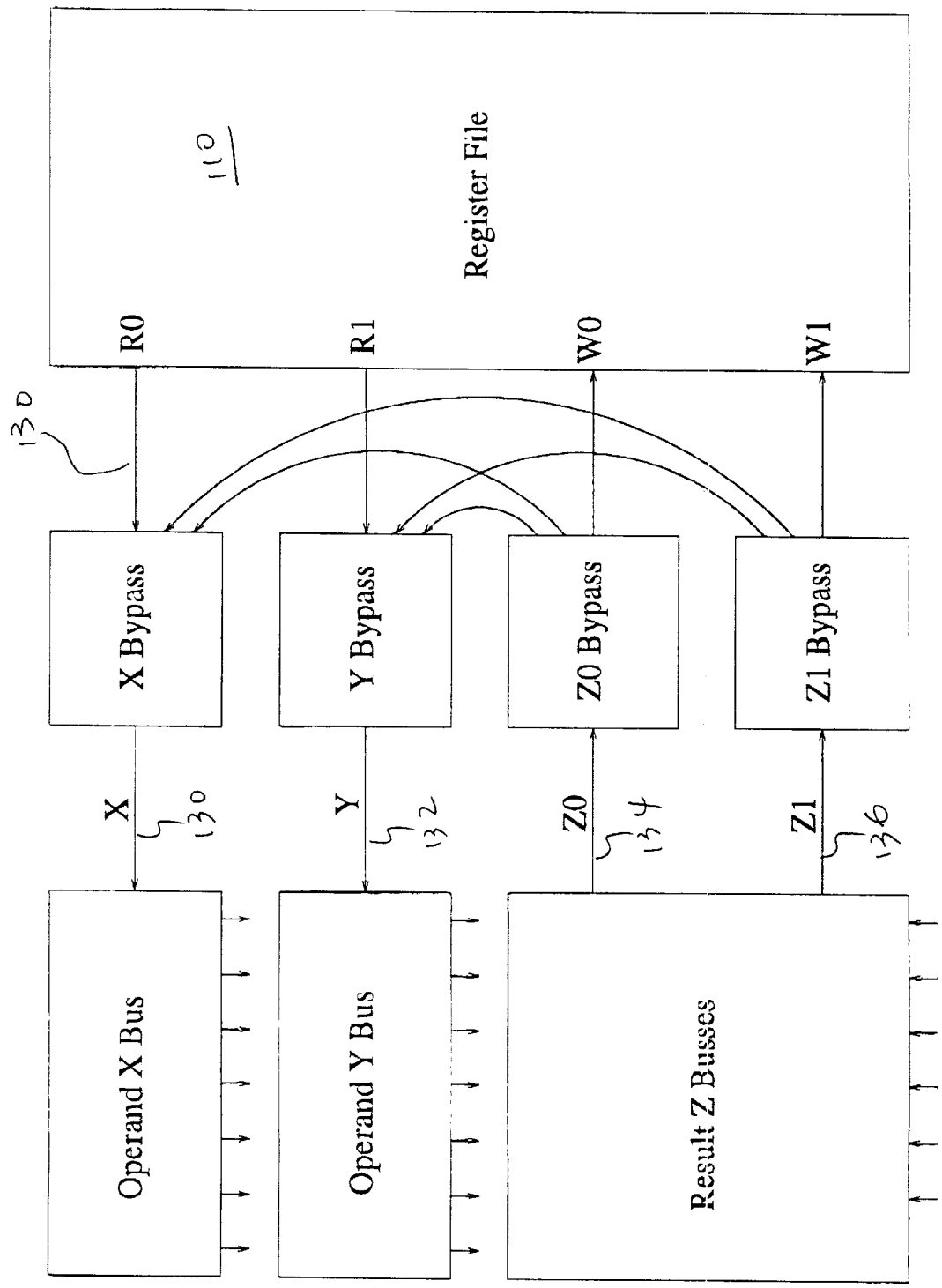
FIG. 2 is a block diagram showing one exemplary configuration of communication buses, bypass units, and the register unit.

FIG. 2 is a block diagram showing one implementation of the bypass and execution buses. The register unit 110 has two read ports and two write ports. The register bypass connects the register file's ports to the X and Y operand buses, and the Z0 and Z1 result buses. The X and Y buses are 1-to-6: they are used to send an operand from the X or the Y bypass to 1 of 6 units. The Z0 and the Z1 buses are 6-to-1: they are used to send the results from the units to the Z0 and Z1 bypass. The data on a result bypass may be written back into a register, or both written back into a register and sent to an operand bus in the case of a bypass. A bypass takes place when the operand of an instruction is the result of the previous instruction. Because the EU's are not aligned in any particular order in the pipeline, each unit communicates directly with the bypass unit, and therefore bypassing can take place between any two EU's.

The ports of the register file are also buses: The R0 and R1 ports are 32-to-1 buses, and the W0 and W1 ports are 1-to-32 buses. Each unit is connected to a bus through a bus-interface process. An additional asynchronous channel delivers the selection control to these processes in the form of a 1-of-N code.

Two result buses are used in an interleaved scheme in order to reduce pipeline stalls caused by discrepancies between execution unit latencies. For instance, if an instruction is assigned to write back to result bus Z0, but has a large latency (like a cache miss), the next instruction can still write back on result bus Z1 in parallel if there is no data dependency. Interleaving the result buses permits a latency mismatch of the execution units equal to the processor's cycle-time without reducing the processor's throughput.

Handling of Precise Exceptions

A processor's normal operating flow retrieves values from a program counter. These values can be used to address a fetch memory to retrieve instructions therefrom. This normal routine hence allows various instructions to be fetched and executed. Certain operations interrupt this normal routine. The process of interrupting this normal routine is called an exception routine. Exceptions may be caused by a number of events, such as data overflows and underflows, I/O requests and other occurrences which may happen during executing an instruction in an execution unit, during fetching an instruction from a memory unit, or any other time during operations (e.g., an external interrupt).

MIPS R3000 requires handling of precise exceptions: at the end of the exception, all registers and other data holding structures need to have the same values that they had at the beginning of the execution of an instruction that causes the exception. This may include instructions that are already in the pipeline and whose answers have even already been computed but not yet communicated. A precise exception restarts the process as if the instruction causing the exception had not taken place.

The handling of precise exceptions is another unique aspect of the asynchronous processor 100 shown in FIG. 1. Since an asynchronous pipeline is a totally distributed system, reconstructing the precise global state of the computation at which an exception occurs is different from, and more complicated than, a synchronous pipeline.

Consider an exception detected in an execution unit. First, by definition of precise exceptions, the exception mechanism has to guarantee that the instruction that caused the exception, and all instructions following the exception in the pipeline before the first instruction of the exception handler, do not change the global state of the computation. These instructions are referred as canceled instructions. Since the global state of the computation is usually represented by the values in the register unit 110 and the execution units such as the memory unit and the divider/multiplier unit, a mechanism is needed to prevent updating these values after an exception occurs. This mechanism is implemented by using the queue units 160*a*, 160*b* and the WB 150 which mediates communication among the execution units in order based on the pipeline contents. Canceling instructions leads to canceling the "write-back" of the results of these instructions' executions to the permanent registers (e.g., GPR, Hi/Lo, and CP0 registers) and to memory.

Second, the command to interrupt the normal pc update has to be sent to the PC unit 102.

Third, the information about the exception (the cause of the exception, the pc of the exception instruction, whether the exception occurred in a branch-delay slot) has to be stored in the proper CP0 registers.

When an exception occurs, the WB 150 sends an exception message to the PC unit 102 via an exception channel 170 and gathers the necessary information about the exception. The PC unit 102 probes the exception channel 170 once per iteration to see if an exception has occurred. Since the processing is asynchronous, an exception message sent by the WB 150 may not be instantaneously detected by the PC unit 102. Thus, the WB 150 should be able to process an arbitrary number of instructions before the exception condition is detected by the PC unit 102. This is accomplished by implementing the FIFO queue 160*b* in the communication between the WB 150 and the pc unit 102 to store the exception information. Hence, the writeback unit 150 does not have to wait for the pc unit 102 to determine an exception before processing additional instructions.

In order to determine the sequence of canceled instructions, the program order of instruction execution must be recorded before the decoder 108 dispatches decoded instructions to the different execution units. To that effect, the decoder 108 maintains a queue of unit numbers by using the unit-number queue 160*a* that represents the order in which the decoder 108 dispatches the instructions to the execution units. The contents of the queue 160*a* therefore respectively indicate, in order, the execution units and the order in which values from those execution units need to be accepted. As an example, consider instructions 1, 2 and 3. Instruction 1 is assigned to unit 1; instruction 2 is assigned to unit 3, and instruction 3 is assigned to unit 5. The pipeline unit 132 stores, in order, 5, 3, 1. The value of 1 is the most recent value. The write back unit 150 reads the most recent value and determines that it needs to accept the next value it gets from unit 1. After it gets an instruction from unit 1, unit 3 is the next highest order element, and so it accepts the next value from unit 3. The write-back unit 150 hence governs the order of writing operations.

However, the queue 160*a* does not indicate exactly which instruction is executed by a particular unit. This information is obtained from the second queue 160*b* disposed between the pc unit 102 and the writeback unit 150. The queue 160*b* stores the program counter values generated by the pc unit 102 and feeds these values to the writeback unit 150 in the sequence that these values are received. The writeback unit 150 thus can precisely determine which execution unit generates a result received by the writeback unit 150 and which instruction is executed by that execution unit to produce that result.

During normal operation, the writeback unit 150 receives a result from the execution units and sends it to an intended location such as the register unit 110 or the system memory. At the same time, the writeback unit 150 also retrieves data from the queues 160*a* and 160*b*. The information from the queue 160*b* is, however, discarded by the writeback unit 150 since there is no need to keep such information. It is only when an exception occurs in one or more of the execution units that the information from the queue 160*b* becomes important.

Each execution unit which can cause an exception communicates to the WB 150 whether the instruction just executed resulted in an exception. The WB 150 cancels the writing of the instruction result into the registers if that instruction or a preceding instruction caused an exception. The WB 150 reconstructs the unit order by polling the execution units in the order of the unit numbers in the queue 160*a* and determines which instruction causes that exception by the output program counter value from the queue 160*b*.

The interaction between the execution units and the WB 150 is very different from what usually takes place in a synchronous pipeline. Because the EU's are not aligned in any order in the pipeline, the WB 150 is not placed "at the end of the pipeline," but rather "on the side." Each EU currently sends its result to the bypass 140 and communicates with the WB 150. If the result has to be canceled because the instruction is one of the canceled instructions, the WB 150 sends a "kill" message to the register unit 110 to cancel the result in the register unit 110.

The WB 150 needs one additional bit of information in order to stop canceling instructions. The PC unit 102, therefore, is configured to gernerate a "valid-again" bit. When a program counter value is sent by the PC unit 102 to the FETCH 104, a valid-again bit is also attached to the program counter value. This valid-again bit is then attached to the fetched instruction sent to the DECODE 108, and in turn to the unit-number queue 160*a*. When the WB 150 reads a unit number with the valid-again bit set, it stops discarding instruction write-backs. The first pc tagged with the valid-again bit set is not the pc of the first instruction of the exception handler but that of a pseudo instruction preceding it.

This pseudo instruction is inserted by the fetch unit 104 to handle the exception. This instruction causes reset of the various values, and restores the values in the registers using exception handling techniques which are known in the art. This special pseudo instruction is passed entirely through all of the processing components in the asynchronous pipeline; i.e., it is fetched, passed through the decoder 108, through a special MIPS execution unit CP0 and through the write-back unit 150. The pseudo instruction also commands the fetch 104 to be held and prevents it from fetching any new instructions. This pseudo-instruction is decoded as a CP0 instruction and is executed by the CP0 unit. The purpose of this pseudo-instruction is to store the information about the exception in the proper CP0 registers, before the exception handler instructions can use these CP0 registers.

The above precise exception handling can be modified to handle speculative execution of instructions in an asynchronous pipeline. A speculative execution is used to increase the processing speed by selecting and executing a particular routine in a branch with at least two routines based on a prediction of a branch parameter. If the prediction is correct, the corresponding executions are already completed by the time the branch parameter is evaluated. Thus, the processor can go forward to perform the instructions subsequent to the branch. This saves time. However, when the prediction is incorrect, the results of the executed instructions in the false-predicted routine must be corrected or discarded.

It is contemplated that the above false prediction can be treated as a "fake exception". All instructions following the fake exception are discarded until a valid-again instruction is executed. In that case, the valid-again instruction is the fake exception instruction. Therefore, the above technique based on the writeback 150 and the queues 160a, 160b can be used to handle such false predication in a speculative execution. One difference is that the Fetch unit 104 has to assign to the exception address program count value of the fake exception instruction so that normal operation may resume at the proper program address.

Low-latency Addition

Apart from the shifting and logical operations, there are two types of arithmetic operations in the MiniMIPS: addition and comparison. There are four types of addition and comparison instructions, depending on whether the instruction uses the immediate field or a register as one operand, and whether the operation is signed or unsigned. Subtraction is either signed or unsigned, and cannot use immediates.

All the addition/subtraction and comparison instructions are executed in a single four-stage pipelined execution unit which well be referred to as "adder." The adder can generate an overflow exception on addition and subtraction instructions. When an instruction for this unit is received by the decode, the unit receives operands from the X and Y buses and possibly the immediate buses and additional control information from the decode. The adder produces its output on one of the two Z buses as well as a bit indicating whether the instruction raised an exception.

The standard techniques for binary addition include using a carry-lookahead adder (a kill-propagate-generate adder), a carry-select adder, or a conditional-sum adder. In an asynchronous system, it is possible to use a simple ripple-carry binary adder, since the average-case latency (assuming the inputs are bitwise independent) for binary addition is $O(\log N)$, where N is the number of bits in the input. Since the adder is used in latency-critical parts of the processor such as address calculation in the memory unit, an adder with a worst-case latency of $0(\log N)$ instead of $O(N)$ is then used.

Most fast binary adders are based on the kill-propagate-generate (kpg) technique. Assuming that a relatively samll number of n-type transistors in series are used (e.g., not more than six for the process), a pipelined full-throughput kpg adder would take seven stages of logic, including the part of the adder that conditionally reads from different buses and conditionally inverts the input for subtraction. Carry-select and conditional-sum adders speculatively compute results based on the different inputs and therefore waste energy. The amount of the speculation used in the adder should be kept to a minimum.

The adder is a hybrid between a kpg adder and carry-select adder. The first stage of the adder computes the kpg code for each input bit. Next, a kpg tree adder is used to compute the two possible sums for each I-bit block. The carry-in for each I-bit block in parallel with the block addition. These two operations constitute the next two stages of the adder. The final stage of the adder selects the appropriate sum for each 8-bit block and produces the output.

HSPICE measurements indicate that this execution unit can execute the required arithmetic instructions at a throughput of 280 MHZ at 75° C., with a worst-case input to output latency of 1.6 ns. The current architecture will scale to a 65-bit adder without significant latency or throughput penalty.

Pipelined Caches

In the preferred embodiment, the cache system for the asynchronous processor 100 of FIG. 1 has two four-kilobyte (1 page) caches: an instruction cache (I-cache) and a direct-mapped data cache (D-cache). The caches are similar or substantially identical. The D-cache has provisions for writing (using a write-through mechanism with a write buffer) and the I-cache has provisions for branch prediction and predecode. Cache refills are carried out with a 128-bit (4 line) refill block.

Some functions that are part of the MIPS cache specification have been omitted for the sake of simplicity: the isolate-cache and swap-cache mechanisms, the explicit invalidation mechanism, and the ability to change the size of the refill block. The MiniMIPS instruction set also omits partial-word operations. The cache architecture has been designed so as to make it easy to add partial-word operations while maintaining low latency and high throughput on the more common word loads and stores.

Cache Pipelining

In order to achieve the high density, the static RAM of the cache core was designed with an average access time of 3 ns, almost an entire instruction fetch cycle. Allowing an additional 1.5 ns for tags comparison and the subsequent decision to accept or discard the value read from the cache core puts the latency through the entire cache system at 4.5 ns for a cache hit. The maximum cache performance required is obtained with one cache operation per instruction per cache-one instruction fetch from the I-cache and one load from the D-cache. This pipelining allows compensation for the average latency of the cache cores.

An unpipelined cache would look up the contents of a cache line, compare the tags, and then decide whether to output the data as its result and go ahead with the next operation or to read the data from memory, refill the cache core, and continue. The design is pipelined so that the cache control issues a lookup to the cache core before deciding whether the previously lookup was a hit or a miss. The cache core is pipelined internally, allowing the two lookups to proceed independently and concurrently unless they refer to the same block in which case they are strictly sequentialized. The cache array is implemented as a pipelined tree fanning out to 16 leaf-cells.

This pipelined cache implementation introduces problems analogous to "structural hazards." Assume that a load word at an address is immediately followed by a store to that address. The store instruction updates the value in the cache and in the main memory. If the load hits in the cache, the update in the cache will take place after the load and the execution is correct. If, however, the load misses, the store will already have been issued to the cache core (since the cache is pipelined), and will update the cache line immediately without checking any further conditions. Meanwhile, the refill of the line has begun, and the final state will be that the value that was written to the cache core will be overwritten by the old value from main memory.

Another, less serious, problem with the pipelined cache implementation concerns multiple consecutive loads in the same refill block. This is likely to happen in programs with locality of data reference. If the first load misses, the second is likely to miss as well, needlessly causing two cache refill operations of the same block.

The same solution for the write-after-write hazard and the double refill problem is used. The cache is given the ability to repeat certain operations that are affected by the dependencies between successive cache lookups. A cache store is repeated when it follows the stored data by a refill. A load is repeated when it is a miss, and it follows another load miss to the same line.

The implementation uses an additional eight-bit comparator to check whether a read miss or write occurring after a read miss is to the same block. If the operations refer to the same block, the operation following the miss is repeated (repeated writes are not repeated to main memory but only to the cache core); if not, they are allowed to proceed. The logic to detect these cases is added to the R process. Interestingly, it would be possible to repeat more operations, e.g., by omitting the comparator and always repeating the instruction after a load miss; this would lead to a simpler but slightly less efficient solution.

The MiniMIPS cache system has a variable latency. When a cache miss occurs, the effect on latency is hidden from the rest of the system simply by allowing the handshakes between the cache and the main CPU pipeline to stretch. Internally, the cache array has also a variable latency. The throughput of a leaf of the tree of cache cells is only one half that of the CPU as a whole. But, by interleaving the accesses to different leaves, the total throughput of the cache array is brought up to match that of the main CPU pipeline. This means, on the other hand, that the access time through the cache depends on the address of the data. If two reads are dispatched that refer to data in the same leaf, the latency of the second read will be greater than if they had referred to separate blocks. Again, the delay-insensitivity of the pipeline makes these latency variations transparent to the rest of the system.

Microarchitecture and Circuit Techniques

The following describes implementations of the asynchronous pipelining of the asynchronous processor 100 shown in FIG. 1 at the microarchitecture level. It is discovered that very fine pipelines are desirable to minimize the figure of merit, $E\tau^2$. In order to achieve desired high-throughput and low latency, additional features are added to the processor including, low forward-latency pipeline stage, slack matching, and pipelined completion. Preferably, all lowest level processes are pipelined; all cells combine computation and buffering (latching) of the data.

Since no clock signal is used to synchronize the processing by different stages in a pipeline, handshaking protocols are needed for communication, e.g., indicating beginning and ending of a token being exchanged between two connected processing stages.

One embodiment is a 4-phase handshake protocol for different processes to communicate through channels. The data is encoded using two types of delay-insensitive ("DI") codes: 1-of-N or dual-rail code. In a 1-of-N code, one rail is raised for each value of the data. In a dual-rail code, two rails are used to encode each bit of the binary representation of the value (see, e.g., U.S. Pat. No. 3,290,511).

Figure 3:
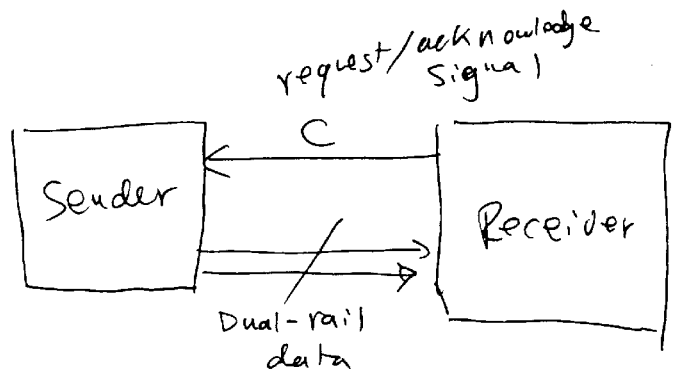
FIG. 3 is a diagram illustrating two adjacent stages in an asynchronous pipeline that communicate through a 4-phase handshaking protocol.

A DI code is characterized by the fact that the data rails alternate between a neutral state that doesn't represent a valid encoding of a data value, and valid state that represents a valid encoding of a data value. See, Alain J. Martin, "Asynchronous Data paths and the Design of an Asynchronous Adder" in Formal Methods in System Design, 1:1, Kluwer, 117–137, 1992. A channel communication goes through four phases. The sending process waits for an "enable" from the receiving process to be true, then it sets the data rails to a valid value. The receiving process lowers the "enable" after it has latched the data. The sender waits for the "enable" to be false, then sets the data rails to the neutral value. Finally, the receiver raises the "enable" to allow the next communication to start. FIG. 3 shows two pipelined stages, a sender and a receiver, communicating through the above 4-phase handshaking protocol.

In HSE notation as defined in U.S. Pat. No. 5,752,070, sending the value of a one bit variable x over channel C and receiving it in variable y can be represented by:

Sender$\equiv$[$C^e$]; [$x^0 \rightarrow C^0 \uparrow \Pi x^1 \rightarrow C^1 \uparrow$]; [$\neg C^e$]; $C^0 \downarrow$, $C^1 \downarrow$;

Receiver$\equiv$[$C^0 \rightarrow y^0 \uparrow \Pi C^1 \rightarrow y^1 \uparrow$]; $C^e \downarrow$; [$\neg C^0 \wedge \neg C^1$]; $C^e \uparrow$;

where, *[S] repeats statement S infinitely, the [B] waits for a boolean expression to be true, and the [$B_0 \rightarrow S_o \Pi B_1 S \rightarrow S_1$] waits for one of the boolean expression $B_0$ or $B_1$ to become true, then executes the corresponding statement $S_0$ or $S_1$. The semicolon indicates two statements be executed in sequence, and the comma lets two statements execute in parallel. The $v\uparrow$ and $v\downarrow$ set a boolean variable v to true and false respectively. The superscripts are used to indicate the data rails and enable of a channel.

It has been discovered that certain process in the handshaking protocol may be shifted relative other processes in the order of execution to simplify the circuit and/or to improve the processing performance.

Figure 4:
FIG. 4 is a diagram showing a 1-bit buffer stage in an asynchronous pipeline.

Consider a simple buffer stage in an asynchronous pipeline shown in FIG. 4. The buffer receives one bit of data x on Channel L, and sends the data without computation on channel R:

*[L?x; R!x].

Using the send and receive handshakes, the buffer stage can be implemented as follows:

*[[$L^0 \rightarrow x^0 \uparrow \Pi L^1 \rightarrow x^1 \uparrow$]; $L^e \downarrow$;

[$\neg L^0 \wedge \neg L^1$]; $L^e \uparrow$;

[$x^0 \rightarrow R^0 \uparrow \Pi x^1 \rightarrow R^1 \uparrow$];

[$\neg R^e$]; $R^0 \downarrow, R^1 \uparrow$; [$R^e$]]

]

Note that the process of [$\neg L^0 \wedge \neg L^1$]; $L^e \uparrow$ simply resets the input data channel L to a neutral state and does not have any effect on other processes as long as it is executed prior to receiving next data. Similarly, resetting the output channel R can be executed at any time prior to receiving next data from the L channel. Hence, the reset operations for both R and L channels can be shifted (i.e., "reshuffled") without affecting the overall buffering operation. In general, a reshuffling of a HSE rearranges the non data-dependent portions of the four-phase communication in a special way to improve speed and size.

Three different reshufflings of the HSE for the buffer have been found to have special advantages in improving the performance of the buffer and simplifying the buffer circuit. These three different types of HSE reshufflings can also be applied to other processing components in an asynchronous pipeline. The three reshufflings are called HB (half-buffer), PCHB (precharge-logic half-buffer), and PCFB (precharge-logic full-buffer). All three reshufflings eliminate the explicit variable x by computing the output data directly from the input data.

For a half-buffer, the communication phases of the inputs alternate with the phases of the output.

HB$\equiv$*[[$R^e$]; [$L^0 \rightarrow R^0 \uparrow \Pi L^1 \rightarrow R^1 \uparrow$];

$L^e \downarrow$; [$\neg R^e$]; [$\neg L^0 \wedge \neg L^1$];

$R^0 \downarrow, R^1 \downarrow$; $L^e \uparrow$]

]

By adding more inputs and more outputs, and by including more complex logic in the selection statements, this type of cell may also do computation as well as buffering.

For large numbers of inputs, the half-buffer is inefficient as the wait for the neutrality of the inputs ($\neg L^0 \wedge \neg L^1$) grows unmanageably large, and must be done before the outputs are reset ($R^0 \downarrow, R^1 \downarrow$). For most cells with computation, a precharged half-buffer ("PCHB") reshuffling can be used. This reshuffling postpones the wait for the input neutrality. Since there is no data transmitted on the second half of the handshake protocol, this is allowed. The PCHB reshuffling for a buffer is:

PCHB≡*[[$R^e$]; [$L^0 \to R^0 \uparrow \Pi L^1 \to R^1$];
$L^e \downarrow$; [$\neg R^e$]; $R^0 \downarrow, R^1 \uparrow$;
[$\neg L^0 \wedge \neg L^1$]; $L^e \uparrow$
]

Hence, adding more input and output channels simply enlarges the expressions that $L^e \uparrow$ and $L^e \downarrow$ must wait for. These expressions can be broken down into completion trees of OR gates followed by C-elements to check the validity and neutrality of the input and output channels. A C-element is a two-input logic gate which outputs a high only when both inputs are high and outputs a low only when both inputs are low and the output remains unchanged from a previous value if the inputs are different.

In circuit implementation, the main block of computation looks like precharge dual-rail domino-logic. We usually do the logic computation in a network of n-transistors, precharged by one or two p-gates in series.

Figure 5:
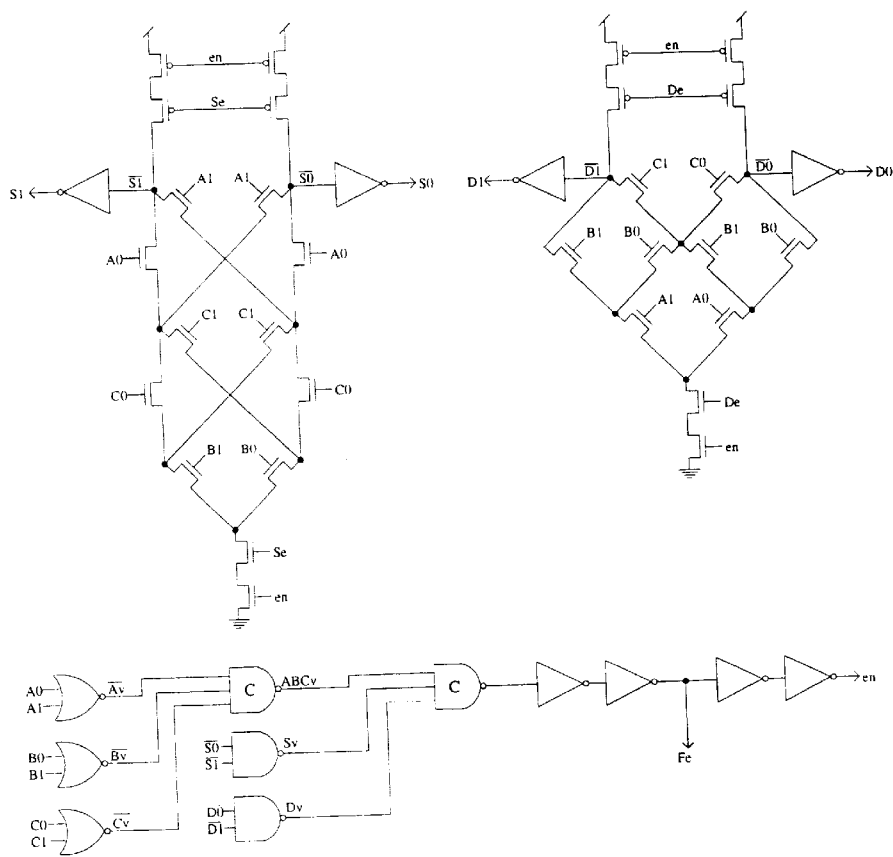
FIG. 5 is a circuit showing a precharged half buffer full adder.

These inverted rails are sent through inverters to produce the output, so that these cells can be easily composed. A PCHB implementation of a one-bit full adder is shown in FIG. 5.

The above PCFB reshuffling can be applied to circuits requiring higher speed (mainly the buses, register bypass, and register file). This reshuffling allows the reset phases of the input and output communications to execute in parallel. An internal state variable en is added so that the PRS can be compiled. The HSE for a one bit buffer is:

PCHB≡*[[$R^e$]; [$L^0 \to R^0 \uparrow \Pi L^1 \to R^1 \uparrow$]; $L^e \uparrow$; en↑;
([$\neg R^e$]; $R^0 \downarrow, R^1 \downarrow$), ([$\neg L^0 \wedge \neg L^1$]; $L^e \uparrow$); en↑]

Although this reshuffling requires a state variable en, it leads to a very efficient CMOS implementation.

Essentially both the output data and the input enables are produced by precharge logic blocks as soon as possible. The en must check that the output data has actually become neutral, but the input enables don't have to. Thus, the neutrality test of the output data overlaps with raising the left enables. This reduces the number of transitions on the handshake cycle and reduces the load on the circuits for the input enables.

These types of processes produce a deep pipeline when composed, but each process has the forward latency of only a N-logic pulldown followed by an inverter. Since no extra latches are required, these processes are energy and area efficient, compared to non-pipelined QDI alternatives. In forward latency, these cells are superior to synchronous dual rail domino logic, since there are no latches at the end of a block of logic, and no extra timing margin is necessary. The intrinsic pipelining also yields a very competitive throughput. Although restricted, this design style has produced high performance circuits for caches, buses, registers, control, and arithmetic.

Although all the stages of the execution pipeline are finely pipelined and can include a large number of tokens, the maximal number of tokens that a pipeline can contain, the "slack" of the pipeline, may not be the optimal number of tokens for achieving the maximum throughput. For the pipeline to process the tokens at optimal throughput, the tokens have to be spaced through the pipeline. The optimal number of stages per token for maximum throughput is determined by the ratio of the cycle period over the forward latency of a pipeline stage. The circuit characteristics of the pipeline stages chosen for the asynchronous processor 100 in FIG. 1 are such that the optimal throughput is achieved fro 8 stages per token. As a consequence, the execution pipeline contains 3 tokens on average.

The slack of a communication channel indicates the maximum difference possible between the number of messages sent and received on the channel. This slack is implemented with buffers that are pipeline stages.

Given a linear array of pipeline stages, the steadystate cycle time and latency through the pipeline stages are governed by the cycle time of individual stages and constraints introduced due to interactions between neighboring stages. The pipeline stages described above introduce constraints on the cycle time $\tau$ of the form $\tau \geq t_0$. For a ring of N pipeline stages, each with a steadystate cycle time of $\tau$ and latency l with one token flowing through the ring, there is an additional constraint, namely, $\tau = lN$. Latency constraints of the form $l \geq l_0$ are also possible. The optimal cycle time $t_0$ can be attained when $N = N_0 = t_0/l_0$.

If a ring of pipeline stages in the system does not have $N_0$ stages per token, it will not operate at the maximum possible throughput. Its throughput then can be increased by modifying the number of stages in the ring until there are $N_0$ stages per token. This can be done in various ways, including modifying the extent to which a unit in the ring has been pipelined and explicitly introducing buffer stages in the ring. This process of adjusting the slack on channels to optimize the throughput of the system is referred herein as slack matching.

The pipeline stages used in the MiniMIPS typically have $t_0 \approx 3.5$ ns and $l_0 \approx 0.44$ ns. Therefore, the optimal cycle time in a ring of these pipeline stages is obtained at $N_0 \approx 8$.

Rings of pipeline stages are present in a number of places in the MiniMIPS. Some optimized critical loops were the pcunit-fetch-decode loop, the loop through an execution unit to the register file and back to another execution unit that corresponds to data-dependent instructions, and the loop in the pipelined cache implementation. For example, the pcunit-fetch-decode loop contains two tokens; it was optimized to contain 16 pipeline stages so as to operate at 280 MHz.

The execution units in the MiniMIPS have different latencies as a result of different degrees of pipelining, ranging from ¼th of a cycle for logical operations to over 1 cycle for a load from data memory. The result buses are alternately used to compensate for this latency variation. Suppose a load from memory is writing its result back on bus Z0. If the following instruction is not data-dependent on it (indeed, the MIPS architecture specifies that the compiler should guarantee that this is not the case since loads have a one instruction data-hazard), it can write back its results in parallel on bus Z1. Observe that interleaving the use of the result buses permits us to tolerate a latency mismatch of up to one cycle without dropping below peak throughput.

Pipelined Completion

An asynchronous system does not have a clock signal to synchronize the processing of different processing elements. Thus, a pipeline stage or functional unit needs to generate its own "completion signal" to indicate the completion of that stage and the availability of the result for the next stage.

Figure 6A:
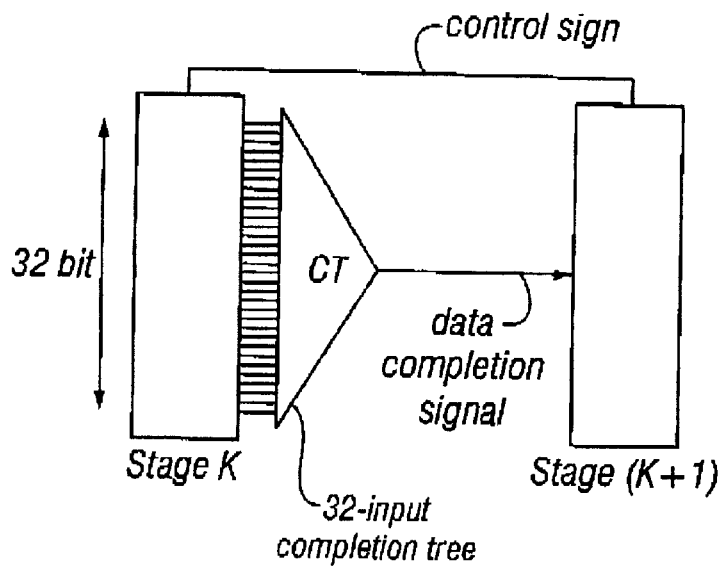
FIG. 6A shows a 32-bit non-pipelined completion circuit.

The generation of a completion signal takes a time proportional to logN, where N, is the number of bits of output data. The throughput of such an asynchronous system is determined by the delay through the longest cycle of transitions, which is also called the "critical cycle". Since a critical cycle usually has 2 completion signals for 32 or 64 bits of output, the performance of a pipeline including such a completion mechanism is seriously limited. FIG. 6A shows a non-pipelined 32-bit completion circuit. The completion detection problem is at least the partial cause of the remaining skepticism against asynchronous techniques.

One aspect of the invention is to implement pipelined completion mechanism. The data path is decomposed into small units, for example, four units of 8 bits wide. This breaks a long critical cycle into shorter cycles through pipelining. Each unit generates a completion signal through a small 8-input completion tree that has a small and constant delay. Preferably, buffers (e.g., C-elements) are inserted between two sucessive stages of the discomposed completion tree to reduce the critical cycle. For example, such buffering can be configured to allow overlap of the test of neutrality of one small unit and the test of validity of the other small unit.

Figure 6B:
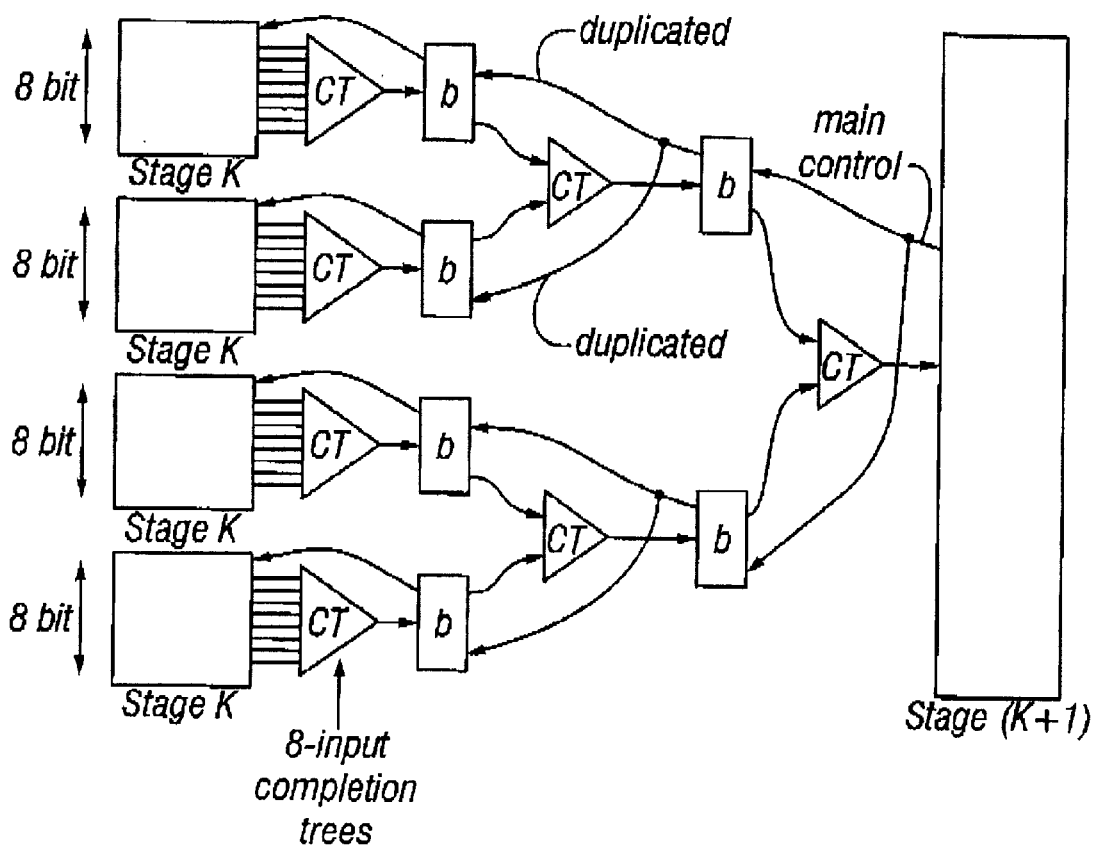
FIG. 6B shows a pipelined completion circuit based on the circuit in FIG. 6A.

FIG. 6B shows one implementation of the above pipelined completion based on the system in FIG. 6A. The collection of all the unit completion signals is pipelined, and therefore does not appear on any critical cycle. Now, the completion detection overhead is reduced to a small constant, that of a single unit.

The non-pipeline system shown in FIG. 6A uses a single control signal to control all 32 bits. This usually causes delay to sequentially send control signals to each bit. One feature in the pipelined system in FIG. 6B uses a distribution scheme to reduce such delay, thereby further improving the performance. The main control signal is duplicated and each duplicated signal is sent to a buffer stage. At each buffer stage, the respective control signal is further duplicated. This repeats at each stage. This distribution essentially effects another pipelining.

Therefore, the system in FIG. 6B implements two types of pipelining. The cycle time is decreased by a combination of deep pipelining and pipelined completion.

Although only a few preferred embodiments are described, other variations and modifications are possible without departing from the spirit and scope of the claims.

What is claimed is:

1. A system, comprising:
   a plurality of execution units, each independently capable of executing information contained in an instruction, and each operating to complete operation of an instruction and signal its readiness to complete another instruction in a time it takes to finish executing the instruction, without reference to a common system clock;
   an instruction obtaining part including a program counter coordinating obtaining instructions from an instruction memory:
      a first cache memory, including designations associated with said plurality of execution units, stored in an order which represents an order of execution by instructions in said plurality of execution units;
      a second cache memory, including information on instructions which are to be executed by said plurality of execution units; and
      a write back unit, responsive to said first and second cache memories, and operating to detect an exception, and to cancel writing from said execution units in response to said exception, and reconstructing unit order based on information in said first cache memory and determining which instruction causes the exception based on information in said second cache memory, otherwise discarding the information in said second cache memory.

2. A system as in claim 1, wherein each of said execution units is coupled to said write back unit, and communicates information about said exception to said write back unit.

3. A system as in claim 2, wherein said write back unit is also responsive to a pseudo instruction which restores values in the registers.

4. A system as in claim 1, wherein said execution units include at least a memory unit and at least one arithmetic logic unit.

5. A system as in claim 4, further comprising a plurality of register units including register parts, selectively connected to said execution units.

6. A system as in claim 5, wherein said write back unit cancels writing from said execution units to at least one of said register parts in response to said detection of said exception.

7. A system as in claim 1, wherein said instruction obtaining part includes a fetching unit, responsive to said program counter unit, to receive information from said program counter unit.

8. A system as in claim 7, further comprising an instruction memory unit, which includes instruction information, said instruction memory unit responsive to said fetch unit to provide instruction information responsive thereto.

9. A system as in claim 8, further comprising a decoder, coupled to said fetch unit, to receive information therefrom.

10. A method, comprising:
    obtaining a plurality of instructions in an asynchronous processor, to be executed substantially simultaneously, in a pipelined fashion;
    in each of a plurality of execution units, receiving one of said instructions, and executing and completing said instruction in the time it takes to execute and complete said instruction independent of a comment system clock, and requesting and next instruction when completed, independent of said comment system clock;
    storing designations associated with said plurality of execution units in a first cachememory, said designations being stored in an order that represents an order of execution;
    storing instruction information associated with said plurality of execution units in a second cachememory, said instruction information including information about the instructions being propped by said he plurality of execution units; and
    detecting and exception in any of said execution units, and using said designations information and said instruction information to restore the execution to based on said exception; and
    otherwise, when no in exception is detected, discarding at least said instruction information from said second cachememory.

11. A method as in claim 10, wherein said instructions include instructions that are executed in an arithmetic logic unit.

12. A method as in claim 10, further comprising, responsive to detecting said exception, preventing of execution unit with caused said exception from completing a memory operation associated with the instruction that caused the exception.

* * * * *

UNITED STATES PATENT AND TRADEMARK OFFICE
CERTIFICATE OF CORRECTION

PATENT NO. : 6,381,692 B1
DATED : April 30, 2002
INVENTOR(S) : Alain J. Martin, Andrew M. Lines, Rajit Manohar, Uri Cummings and Mika Nystrom It is certified that error appears in the above-identified patent and that said Letters Patent is hereby corrected as shown below:

<u>Column 1,</u>
After line 11, before "BACKGROUND" please add the following paragraph:

-- The U.S. Government has certain rights in this invention pursuant to Grant No. DAAH04-94-G-0274 awarded by United States Army. --

Signed and Sealed this

Thirtieth Day of July, 2002

*Attest:*

*Attesting Officer*

JAMES E. ROGAN
*Director of the United States Patent and Trademark Office*